Figure 1:
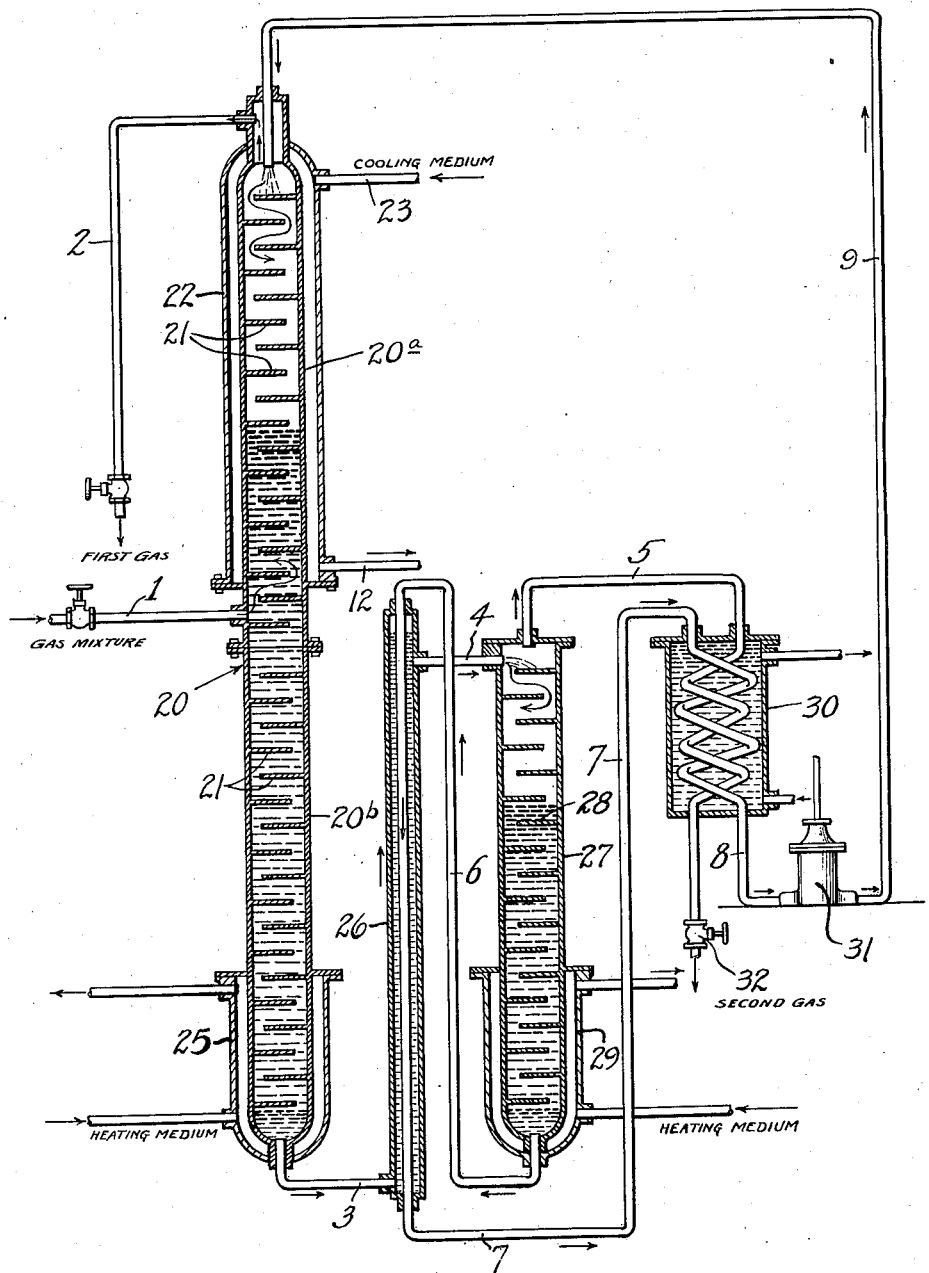

Aug. 4, 1931.  H. BLAU  1,817,667
METHOD OF SEPARATING MIXTURES OF GASES AND OF GASES WITH VAPORS
Filed Sept. 22, 1927  2 Sheets-Sheet 1

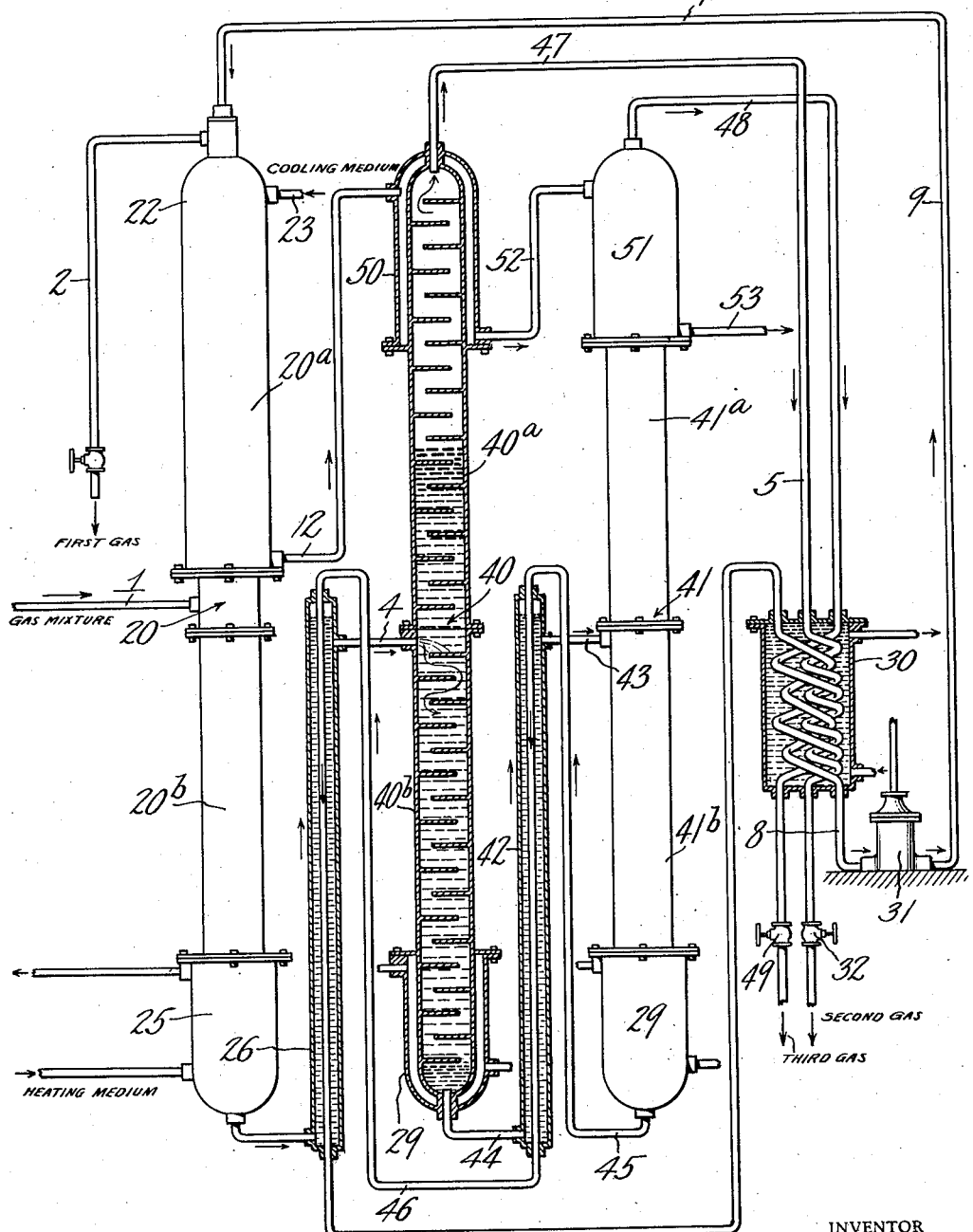

Patented Aug. 4, 1931

1,817,667

UNITED STATES PATENT OFFICE

HERMANN BLAU, OF MUNICH, GERMANY

METHOD OF SEPARATING MIXTURES OF GASES AND OF GASES WITH VAPORS

Application filed September 22, 1927, Serial No. 221,351, and in Germany October 4, 1926.

The apparatus in which my novel method is carried out, is illustrated in the accompanying drawings, the novel features of my invention being more specifically pointed out in the annexed claims.

If a gas mixture is treated with a liquid which in quantity is insufficient to dissolve it in its entirety, such of its component parts which go into solution more readily will be absorbed at a higher percentage than that at which they are contained in the original mixture, as is well known. If the proportion of the gas mixture to the absorption liquid is chosen as $C_1:1$, wherein $C_1$ designates the coefficient of absorption of the more readily soluble component of two component parts of a mixture, and if this gas mixture is supplied at a constant ratio and is carried in a column from the bottom to the top through the liquid which runs from the top to the bottom, then this liquid will absorb the more soluble component part of the mixture entirely and the less soluble constituent to a correspondingly smaller extent, while the not absorbed balance of the latter constituent escapes at the top as a pure gas.

This process may be represented by calculation for instance for the treatment of a mixture having 15% by volume of carbon dioxide and 85% by volume of nitrogen with water as absorbing liquid and at the temperature of say 20° C. as follows:

| Constituent of the gas mixture | Partial pressure | Coefficient of absorption | Gas vol. to liquid vol. | Vol. % |
|---|---|---|---|---|
| $CO_2$ | 0.15 | 0.88 | 0.1320 | 90.66 |
| $N_2$ | 0.85 | 0.016 | 0.0136 | 9.34 |
| | 1.00 | In solution | 0.1456 | 100.00 |
| | | Not dissolved | 0.7344 $N_2$ | |
| Vol. prop. of water to gas mixture=1 | | | 0.8800 | |

As the example shows it is possible in this way to separate a mixture of 15% $CO_2$ by volume and 85% $N_2$ by volume in such a way that the larger part of the nitrogen is separated as a rather pure gas and that the proportion of $CO_2$ which originally was 15% is increased to about 90%. If this high percentage of $CO_2$ is expelled again and if in accordance with the suggestion by Mallet the resulting gas mixture is carried again through a smaller quantity of absorption liquid corresponding to its smaller volume, it should be possible according to this calculation to reach a proportion of these gases in the mixture, in which the $CO_2$ content is increased to more than 99% and from which the nitrogen is practically eliminated. However, the imperfect efficiency inherent to all processes of that kind would naturally make it necessary to repeat this treatment many times if one wishes to get to anything like such a far reaching separation of the two gases.

This would necessitate a very complicated method of separation and also a very complicated set of apparatus, which explains that the separation of gas mixtures by means of an absorption liquid is actually used only in such practical cases, where the mixtures have constituents to be separated of such great differences in solubility that a satisfactory result may be reached by only one washing of the gases by the absorption liquid, as for instance in the treatment of mixtures containing permanent gases and hydrate-forming gases, (such as $NH_3$; $SO_3$, or the like).

Just as the laws of physics governing the process of absorption show, that in a partial solution of a gas mixture the constituent of greater solubility will appear in a greater percentage in the solution than in the original mixture, it appears logical that when a dissolved mixture is expelled again from the solution the escaping gases will always be poorer in the constituent which is more readily dissolved than the mixture which is still in solution and that finally on continuation of the process, a point must be reached where only a part of the more easily soluble constituent is contained in the liquid.

Thus it is apparent that the changes in the percentages of composition which take place in the absorption and the re-expulsion of a dissolved gas mixture are basically the same as the changes which the composition of mixtures of gases or of gas and vapor undergoes during condensation and re-evaporation. The present invention makes use of the practical deduction that the complete separation of a mixture of gases or of gases with vapors can be attained, without repeating several times the partial solution and re-expulsion of the dissolved gases, if in the treatment of the gases in solution one proceeds in exactly the same way as in the treatment by rectification of such a mixture in a liquid or liquefied state. In this treatment, as is well known, the repeated partial condensation and distillation which is necessary in order to bring about complete separation, is effected by means of a rectification column in one consecutive process.

The apparatus in which the aforementioned method can be carried out is illustrated in the accompanying drawings, in which Figure 1 shows the arrangement of an apparatus, partly in longitudinal vertical section, for separating gas mixtures into two constituents, and Figure 2 shows in similar sectional view, an apparatus for separating gas mixtures into more than two constituents.

In accordance with the present invention, the separation of a mixture of gases or gases with vapors by absorption in a liquid is accomplished in such a way that the mixture is usually first raised to a higher pressure and then cooled by water. As shown in Fig. 1, such a mixture is introduced through pipe 1 into the lower part of the upper half $20^a$ of an absorption column 20 wherein it ascends through the descending absorption liquid, supplied through pipe 9, to the top of the column in the required quantity, the gas mixture yielding to this liquid the more easily dissolved constitutent, for instance carbonic acid in the above-mentioned example, substantially in its entirety and corresponding to the state of density of the gas mixture. In that example the nitrogen, which is to be separated from the carbonic acid will be absorbed by the liquid in a smaller quantity corresponding to its smaller solubility, while the undissolved balance of the nitrogen escapes to the top of the column where it is taken off through pipe 2. As is customary in such columns, baffle plates 21 are provided around which the liquid and the gases must pass in their countercurrent paths.

The heat liberated during the absorption is carried off by means of a cooling medium, for instance water circulating through the jacket 22 of the absorption column. The cooling medium is supplied at the top through pipe 23 and escapes through pipe 12 at the bottom of the jacket.

From the lower portion of the upper absorbing column half $20^a$, the absorption liquid, saturated with carbonic acid and containing a small amount of nitrogen, enters the lower half $20^b$ and, while gradually travelling around the baffle plates to the bottom of the column, is gradually heated by means of a heating jacket 25 to a temperature at which, on account of the resulting rectification, the absorbed nitrogen is driven out entirely so that only carbonic acid remains in the liquid. Together with the nitrogen, of course, a certain proportion of carbonic acid will also escape. Since, however, both gases ascend in the column, the carbonic acid will be redissolved by the liquid in the higher, colder portions of the column, so that the expelled nitrogen alone rises to the top of the column together with the main portion of the nitrogen which did not go into solution, as previously mentioned, and which escapes through pipe 2.

From the bottom of column portion $20^b$ the absorption liquid together with the carbonic acid dissolved therein is carried through pipe 3 to the bottom of the heat exchanger 26 and from its top through pipe 4 into the upper part of expeller 27, wherein it travels to the bottom over baffle plates 28 and in doing so is gradually heated by means of a heating jacket 29 to its boiling point so that the carbonic acid contained therein is driven out entirely. Naturally the carbonic acid rising from the lower part of the expeller will carry with it considerable quantities of vapor of the absorbing liquid, a large part of which, however, condenses again in the higher, cooler portions of the expeller, and in doing so yields its heat to the incoming cooler liquid, so that consequently the entering liquid in gradually passing to the bottom of the expeller is gradually preheated to such an extent that most of the carbonic acid dissolved therein is already expelled before the liquid reaches the lower part of the expeller.

The expelled carbonic acid is carried off through pipe 5 while the hot absorbing liquid passes by way of pipe 6 first through the heat exchanger 26, where it transfers its heat to the liquid entering through pipe 3, from there through pipe 7 to the water cooler 30, and thence through pipe 8 to pump 31 which raises it again through pipe 9 to the top of the absorber column 20 and maintains the necessary pressure to continue the described cycle. Pipe 5 conducts the hot gases also through the cooler 30 whence it is discharged through hand valve 32.

Just as with mixtures of liquids it may occur in practice that gas mixtures should be separated into more than two constituents or groups of constituents (fractions). In that case one would proceed as shown in Fig. 2. Here a corresponding number of expellers, for instance 40 and 41, are provided one cascading into the other. In these expellers which function similar to expeller 27 described with reference to Fig. 1, the expulsion of the several constituents or groups of constituents dissolved in the liquid is achieved step by step, one constituent or one group in each expeller within corresponding ranges of temperature, and the various fractions or constituents are carried off separately from each expeller.

Thus after the insoluble gas constituent is separated in column 20 from the mixture entering the apparatus through pipe 1 and after all soluble constituents are absorbed in column 20 in the manner described with reference to Fig. 1, the first constituent or group of constituents is boiled out of the absorption liquid in expeller 40 into which the liquid enters through pipe 4 from absorber 20 after having passed through the heat exchanger 26. In passing to the bottom of the expeller it is heated in the manner described before, the expelled constituent rising to the top, whence it escapes through pipe 47 into cooler 30, at the bottom of which it can be released by the hand valve 32. Like in Fig. 1 a heating jacket 29 is provided at the lower portion of expeller 40. The absorption liquid now freed of the particular kind of constituents, passes from the bottom of the expeller by way of pipe 44 and a second heat exchanger 42 and pipe 43 into the second similarly constructed expeller 41 where the remainder of the constituents are boiled out in similar manner, these constituents rising to the top of the expeller whence they escape by way of pipe 48 into cooler 30, at the bottom of which they can be released by hand valve 49. The absorption liquid collecting at the bottom of expeller 41, being now freed from all previously absorbed constituents, passes by way of pipe 45 through heat exchanger 42, thence by way of pipe 46 through heat exchanger 26 and thence, like in Fig. 1, by way of pipe 7 through cooler 30, at the bottom of which it is drawn up by pump 31 to be delivered again by way of pipe 9 to the top of the absorption column 20 to commence a new cycle.

When submitting to rectification mixtures of hydrocarbons by means of absorption in liquids a certain difficulty is encountered. Generally it is advisable to choose an absorption liquid, the boiling point of which at the absorption pressure is not too high, so that this point can be reached without difficulty by the ordinary means, which is usually at the disposal in industrial plants (like steam or heated liquids with a high boiling point). However, on the other hand such a liquid should be capable of dissolving a large quantity of the gases or vapors to be absorbed. This faculty of dissolving, generally is the greater the lower the boiling point of the liquid. For these two reasons it is advisable to choose from such organic liquids an absorption liquid for mixtures containing hydrocarbons, the boiling points of which are below or only slightly above 100° C.

Now hydrocarbon gas generally contains—though in small quantities—constituents with a boiling point within the aforementioned range of about 100° C., so that it is practically not possible to separate such constituents from the absorption liquid by ordinary distillation once they are absorbed with the gases by the liquid.

This difficulty is overcome in the simplest way by using as absorption liquid such more easily liquefiable hydrocarbons, for instance those which are liquid at ordinary outside temperatures, and which are contained in the hydrocarbon gases to be rectified, and which remain as a by-product. When this by-product is so used it only becomes necessary to eliminate from the apparatus continually the surplus of those liquid hydrocarbons accumulating during the treatment of the gases.

When using absorption liquids with a low boiling point it must be considered that their vapor tension at the temperatures prevailing in the upper part of the expeller is already so considerable that even at higher absorption pressures considerable quantities of vapor from the absorption liquid may be contained in the ascending expelled gases. Therefore, it is advisable to provide on top of the expeller and above the entrance of the absorption liquid a continuation of the column which then on its upper end is equipped with a cooling jacket or a cooling coil so that it becomes possible to condense these vapors by rectification. This is illustrated in Fig. 2. The cooling medium, for instance water, which in Figs. 1 and 2, circulates through jacket 22 of the absorber column 20, leaves that jacket in Fig. 2 and is led through pipe 12 into the upper end of jacket 50 of the first expeller 50 and thence through pipe 52 into the upper end of jacket 51 of the second expeller 41 whence it is finally discharged through pipe 53.

When choosing the pressure at which the absorption shall be carried out, one might consider not only the desirability of having as great a solubility as possible but also some other points. If for instance easily liquefied gases are to be separated, the apparatus and the process can be greatly simplified if the absorption and the expulsion of the easily dissolved liquefiable gases are carried out at or slightly above their pressure of liquefaction (at the surrounding temperature) because in that case the separated gases can be liquefied without further increase of the pressure and filled into the shipping containers, whereas if a lower pressure of absorption is used, it is necessary to draw the gases escaping from the apparatus first into a compressor which compresses them to the pressure of liquefaction. If the separated gases are not to be used or stored at the pressure prevailing in the expeller, the excess pressure may, as is known, be exploited usefully in any suitable kind of prime mover.

If the vapors of a combustible liquid are to be separated from gases containing oxygen (air) it may be dangerous to compress them to higher pressures in order to reach the desired concentration of the solution. In such cases it is, however, possible to concentrate the solution by means of artificial cooling and go only so far with the concentration of the gases as is necessary to overcome the pressure of the column of the liquid in the absorption column and the additional resistances in the pipe system and in the several constituent portions of the apparatus. As the solubility of the gases increases very rapidly with lower temperatures it will be sufficient in these cases to use the artificial cooling furnished by ordinary commercial refrigerating machines.

It is necessary however to use simultaneously higher pressure and artificial cooling if permanent gases are to be separated from each other, which gases generally have at the available temperatures of ordinary cooling water only a small solubility so that with the application of higher pressures alone the desirable concentration of the solution cannot be attained.

Where artificial cooling is used, the cooling medium is carried through the cooling jacket of the absorber and if necessary also through the cooling jacket of the expeller. At the same time before the gases to be separated enter the absorber, they are precooled in a heat exchanger by the separated cold gases escaping from the apparatus so that the cooling occurs as efficient as possible.

I claim:—

1. Continuous method of separating gas mixtures by absorption in liquids, consisting in circulating the liquid in a closed circuit above atmospheric pressure freely through the separator system, supplying the mixture at the same pressure in counter current to a descending stream of absorption liquid, whereby the mixture constituents of high solubility are entirely absorbed, in permitting the enriched liquid stream to descend beyond the point of mixture supply, and in gradually heating said stream at the same pressure on said further descent to a temperature at which the portions of the difficulty soluble constituents, absorbed by the liquid are expelled, and in subsequently expelling at the same pressure the easy soluble constituents from the liquid in a separately descending liquid stream heated at its lower portion to the expulsion temperature of the constituents whose expulsion is desired.

2. Continuous method of separating gas mixtures, containing a plurality of constituents, by an absorption liquid capable of entirely absorbing all but the constituent of lowest solubility, consisting in circulating the liquid in a closed circuit above atmospheric pressure freely through the separator system, supplying the mixture at the same pressure in counter current to a descending stream of said liquid, whereby all but the constituents of lowest solubility are entirely absorbed, in permitting the enriched liquid stream at the same pressure to descend beyond the point of mixture supply, and in gradually heating said stream on said further descent to a temperature, at which the small portions of the constituent of lowest solubility absorbed by the liquid are expelled, and in subsequently expelling at the same pressure the entirely absorbed constituents from said liquid in separate successive steps, each step including a descending stream of the liquid gradually heated towards its lower portion to the particular temperature at which the desired constituent is expelled from the liquid.

3. Continuous method of separating gas mixtures containing hydrocarbons, consisting in circulating the liquid in a closed circuit above atmospheric pressure freely through the separator system, supplying the mixture at the same pressure in counter current to a descending stream of a liquid hydrocarbon derived from the hydrocarbon gases to be separated, whereby the easy soluble mixture constituents are entirely absorbed, in permitting the enriched liquid stream to descend beyond the point of mixture supply, and in gradually heating said stream at the same pressure on said further descent to a temperature at which the portions of the difficulty soluble constituents absorbed by the liquid are expelled, and in subsequently expelling at the same pressure the easy soluble hydrocarbons from the liquid in a separately descending liquid stream, heated at its lower portion to the expulsion temperature of the desired hydrocarbons.

4. Continuous method of separating gas mixtures containing hydrocarbons, consisting in circulating the liquid in a closed circuit above atmospheric pressure freely through the separator system, supplying the mixture at the same pressure in counter current to a descending stream of a liquid hydrocarbon derived from the hydrocarbon gases to be separated, whereby the easy soluble mixture constituents are entirely absorbed, in permitting the enriched liquid stream to descend beyond the point of mixture supply, and in gradually heating said stream at the same pressure on said further descent to a temperature at which the portions of the difficulty soluble constituents, absorbed by the liquid are expelled, and in subsequently expelling at the same pressure the easy soluble hydrocarbons from the liquid in a separately descending liquid stream, heated at its lower portion to the expulsion temperature of the desired hydrocarbons, and in maintaining the absorption pressure near but not below the liquefying pressure of the hydrocarbon gases corresponding to the surrounding temperature.

HERMANN BLAU.